United States Patent
Blair

(10) Patent No.: US 6,700,602 B1
(45) Date of Patent: Mar. 2, 2004

(54) SUBWAY TV MEDIA SYSTEM

(76) Inventor: Scott Blair, 32 Marlow Avenue, Toronto, Ontario (CA), M4J 3T9

( * ) Notice: Subject to any disclaimer, the term of this patent is extended or adjusted under 35 U.S.C. 154(b) by 0 days.

(21) Appl. No.: 09/423,284

(22) PCT Filed: May 6, 1998

(86) PCT No.: PCT/CA98/00439

§ 371 (c)(1),
(2), (4) Date: Feb. 22, 2000

(87) PCT Pub. No.: WO98/51081

PCT Pub. Date: Nov. 12, 1998

Related U.S. Application Data

(60) Provisional application No. 60/045,811, filed on May 7, 1997.

(51) Int. Cl.[7] .............................. H04N 7/18; H04N 5/64
(52) U.S. Cl. ......................................... 348/61; 348/837
(58) Field of Search .................. 348/61, 837; 709/250; 725/46; 726/77; 248/343

(56) References Cited

U.S. PATENT DOCUMENTS

| | | | |
|---|---|---|---|
| 1,894,684 A | 1/1933 | Hawk ........................... 40/593 |
| 3,182,550 A | 5/1965 | Goldine ........................ 353/13 |
| 3,457,006 A | 7/1969 | Brown et al. ................ 352/132 |
| 4,073,368 A | 2/1978 | Mustapick .................... 186/53 |
| 4,352,124 A | 9/1982 | Kline ........................... 348/61 |
| 4,630,821 A | 12/1986 | Greenwald .................... 463/1 |
| 4,647,980 A | 3/1987 | Steventon et al. ........... 348/837 |
| 5,009,384 A | * 4/1991 | Gerke et al. ................. 248/343 |
| 5,059,957 A | 10/1991 | Todoriki et al. ................ 345/7 |
| 5,123,728 A | 6/1992 | Gradin et al. .................. 353/78 |
| 5,229,910 A | 7/1993 | Kasahara ..................... 361/234 |
| 5,463,827 A | 11/1995 | Williams ...................... 40/449 |
| 5,606,154 A | 2/1997 | Doigan et al. |
| 5,666,291 A | * 9/1997 | Scott et al. .................. 709/250 |
| 5,854,591 A | * 12/1998 | Atkinson ...................... 725/76 |
| 6,038,426 A | * 3/2000 | Williams, Jr. ................. 725/77 |

FOREIGN PATENT DOCUMENTS

| | | |
|---|---|---|
| CA | 2089382 | 12/1992 |
| CA | 1316253 | 4/1993 |
| CA | 2183277 | 2/1997 |
| EP | 0 577 054 | 1/1994 |
| FR | 2652701 A1 | 4/1991 |

* cited by examiner

*Primary Examiner*—Chris Kelley
*Assistant Examiner*—Allen Wong
(74) *Attorney, Agent, or Firm*—Nixon Peabody LLP; Jeffrey L. Costellia

(57) ABSTRACT

A television system for subway cars (10) includes a plurality of TV monitors (22) mounted at intervals along the cars (10), at the junction of the sidewall and the ceiling, and a central video signal source unit (23) such as a video tape player, video disk player, computer-based digital video recorder or television receiver, connected to the video monitors (22). Programs of short duration, e.g. 5–15 minutes, matching the average length of a subway ride, and comprising advertising messages, news bytes and the like are played and displayed in the monitors repeatedly during the subway ride.

7 Claims, 6 Drawing Sheets

SUBWAY TV MEDIA SYSTEM

This application claims benefit of provisional application Serial No. 60/045,811, filed May 7, 1997.

This invention relates to video display systems, and more specifically to video display systems mounted in and operating in mass transit subway cars.

It is commonplace to provide visual advertising displays such as posters in mass transit subway cars, where the displays are available for reading by subway passengers during travel. It is also known to equip subway cars with closed circuit television cameras, for surveillance of passenger behaviour and other safety checks. Images of such surveillance are either displayed at a central security facility, or recorded for subsequent viewing in the event of safety problems.

It is also commonplace to equip subway cars with audio public address systems for a myriad of uses, including transit service announcements, community service events, advertising, safety and emergency procedures, as well as inter-staff communications.

Proposals have been made previously to equip other transportation items, especially aircraft, with television or video systems, primarily for the entertainment of passengers on long journeys. Examples of such systems in the patent literature can be found in U.S. Pat. No. 4,647,980 Steventon et al., U.S. Pat. No. 4,630,821 Greenwald, U.S. Pat. No. 4,352,124 Kline, U.S. Pat. No. 5,123,728 Gradin et al., and U.S. Pat. No. 3,457,006 Brown et al.

Entertainment of passengers on subway cars has until now generally been ignored, since the average journey taken by a passenger on a mass transit subway system is usually short, lasting perhaps fifteen minutes. Nevertheless, subway transit riders offer an attractive audience for visual advertising messages, as evidenced by the proliferation of advertising signs which commonly adorn a subway car. In addition, mass transit systems such as subways are in need of extra sources of revenue, to keep passenger fare structures at an affordable level as operating costs rise, and to avoid decreased ridership as a result.

It is an object of the present invention to provide a public service message display system, entertainment system and advertising system for mass transit subway cars.

It is a further object to provide a novel source of extra revenue for a mass transit subway system.

The present invention provides a television public service message display, entertainment and advertising system for subway cars, in which television monitors are provided at spaced intervals in subway cars, to display short duration televisual entertainment and advertising features to subway riders. The system is designed so that advertising spots on it can be sold by the transit system to potential advertisers and sponsors, for extra revenues for the transit system. It takes advantage of the fact that subway riders are, for the most part, occupying a subway car under relatively crowded conditions but for only a relatively brief duration. They are looking for something on which to focus their attention during their brief ride, whilst at the same time often finding it inconvenient to open newspapers, magazines or the like under crowded circumstances and becoming bored by static advertising or other displays around them. The present invention provides properly positioned television monitors displaying moving images of news items, advertising material and the like, viewable by substantially all riders in the car, and filling their need for visual entertainment during the brief duration of their subway ride.

Thus, according to the present invention, from one aspect, there is provided a video system for displaying televised material to passengers in a mass transit subway car, and comprising at least one video display monitor adapted for mounting inside a subway car so as to display televised materials to passengers riding therein, and a video signal source unit operatively connected to said at least one monitor.

According to a second aspect of the present invention, there is provided a subway car for mass transportation and comprising a video display system including at least one video display monitor having a video screen, the monitor being mounted in the subway car in a manner such that the video screen thereof is readily visible to passengers in the subway car, and a video signal source unit operatively connected to said at least one monitor.

The term "video signal source unit" as used herein embraces player units for playing pre-recorded video material, such as computer-based digital video recorders (including CD-ROM players), video tape players and video disk players, and television receivers for receiving live or pre-recorded broadcast television signals from a remote transmitter and supplying these to the video display monitors mounted in the subway cars. One system according to the invention utilizes receivers including computer-based digital video recorders for receiving broadcast television signals from a remote transmitter as the video signal source unit. Such video signal source unit can be located either within the mass transits' premises or on a remote broadcasting site. Alternatively, the invention utilizes a video tape player, a video disk player, or a computer-based digital video recorder, as the video signal source unit. The video signal source unit may be located in the same subway car as that in which the monitor or monitors are located, or in adjacent or remote cars of the same train, with the necessary operative connection between the player and the monitor(s). An individual subway car can be equipped with its own video signal source unit, connected to a plurality of monitors mounted at different, appropriately chosen locations along the length of the subway car. Alternatively, one central video signal source unit can be located in one car of subway train, and connected to monitors in some or all of the cars of the train, to provide a central video signal source unit for the train.

Computer (PC) based digital video recorders basically transmit video signals from a hard drive or CD-ROM storage. They are however also capable of receiving transmitted input at intervals, e.g. news item updates, at, say, hourly intervals, to add to their stored transmittable video data. In this sense they also act as television receivers.

The video signal source unit and video display monitors used in the present invention can be of known, standard form, obtainable as off the shelf items from manufacturers and sales outlets. The connections between them, for display of televised material, are also standard and well within the skill of the art. For example, use can be made of the existing subway infrastructure by which audio announcements are currently transmitted. Alternatively, the connections may be by use of coaxial cables, fibre optics, cell phone systems or satellite transmission, or by other appropriate means.

A preferred system according to the invention is a subway car or plurality of subway cars equipped with a plurality of television monitors, especially LCD-based television monitors, and a video signal source comprising a video tape player, video disk player or computer-based digital video recorder, the video signal source and the monitors being interconnected by suitable electrical cable systems which are self-contained within the subway car. In this way, new subway cars can be built with the video system or parts thereof installed, and usable on substantially any transit system, since the operation of the video system is independent of any previously installed track, tunnel or control systems.

The video system according to the present invention provides a means for communicating a very wide range of information to viewers in an environment ideally suited to communicating short video messages to viewers, especially commercial messages or sponsored community service, or informational news bytes. Most subway rides are of short duration, e.g. 15–30 minutes or less. It is normally undesirable to play television programs of any significant length to subway passengers for fear of distracting them from their proper points of interchange and disembarkation on the subway system. However, the system according to the invention is ideally suited for displaying a series of short, 30 second–1 minute messages, in sequence, such as a series of commercial messages. These can range from straightforward advertising as seen on commercial television, or the type of news feed with corporate sponsorship as seen by cable television viewers, with news services provided by specialized companies in this business. If the information is delivered by video tape player, video disk player or computer-based digital video recorder, it can be repeated at intervals of, say, 5–15 minutes, based upon the average duration of individual subway rides, i.e. the pre-recorded program is of total duration of about 5–15 minutes. If the feed is delivered from an outside source, its delivery depends on the package of the server, and according to agreement between the purchaser and the mass transit management, and other interested parties as necessary.

Typically, the television images displayed by the monitors of the system according to the invention do not incorporate sound, though they may contain rolling script, similar to cable television news channels, or similar to closed-captioning for the hearing impaired. This avoids risk of interference with announcements being played to passengers through the normal audio address system carried by the subway train, and avoids adding to the general noise level experienced by passengers on the subway cars, a noise level which is commonly quite high even under normal running conditions. However, sound may be incorporated where appropriate, for example in safety or emergency situations, or to mark the beginning of a message to which the subway or transmission provider wishes to call attention.

The manner in which the video display monitors are disposed and mounted in the subway car depends to some extent on the design of the subway car itself. Such designs can vary between different subway systems. Normally from 6–12 such colour monitors are provided in each subway car, suitably of 12"–13" size, spaced along the length of the car, and disposed above the windows of the car, in a manner and at a location which does not interfere with the operation of any other essential element of the car (door operation, lights, heating, air conditioning etc.). A subway car is normally constructed so that it has a cavity wall, defined between its outer structural shell and its inner lining wall, the cavity providing for wiring and cables and other mechanical functions, and, at places, containing insulation. The video display monitors in the system of the invention are suitably mounted in the cavity wall.

In a preferred arrangement, the video display monitors have a strong metal frame construction, fixed to the frame of the subway car. The screens are preferably covered with a rigid transparent unit, e.g. of polycarbonate, shaped to coincide with the shape of the internal wall of the subway car at the location of mounting. For example, when the monitor is mounted at the junction of the wall and ceiling of the subway car, where there is commonly provided a concavely curved segment of internal wall, the transparent cover unit is suitably similarly concavely curved, so that it can be mounted as a continuum with the internal walls and blended to contours thereof, with the monitor mounted behind it. The screen is suitably angled downwardly, for best viewing by passengers seated opposite the screen. The entire structure of the monitor, including the cover unit if used, is suitably housed in a stainless steel or strong plastic casement, designed to appear integral with the subway car, without visible edges or protuberances, and matching the materials and colours of the subway car interior.

The video monitors used in the system of the present invention can be of standard, cathode ray tube-based design. Such monitors have the advantage of economy, being mass-produced items manufactured on a very large scale. They are eminently suitable for use in most embodiments according to the invention, and can be viewed clearly from a variety of angles. However, in circumstances where the subway car in operation encounters locations of large magnetic field, it is possible that the picture displayed on a CRT monitor will be distorted as the monitor moves through such location. Any such distortion effect can be reduced by surrounding the monitor, to an extent practical and consistent with its provision of full visual display, with an appropriate shield such as a steel or other ferromagnetic casement. Where such a magnetic field problem turns out to be particularly acute, the CRT-type monitor may be replaced by a monitor incorporating a colour liquid crystal display (LCD) screen, which is not sensitive to intermittent encountering of external magnetic fields.

Specific preferred embodiments of the present invention are illustrated in the accompanying diagrammatic drawings in which:

FIG. 4A is a view, similar to FIG. 4, of an alternative embodiment;

Figure 1A:
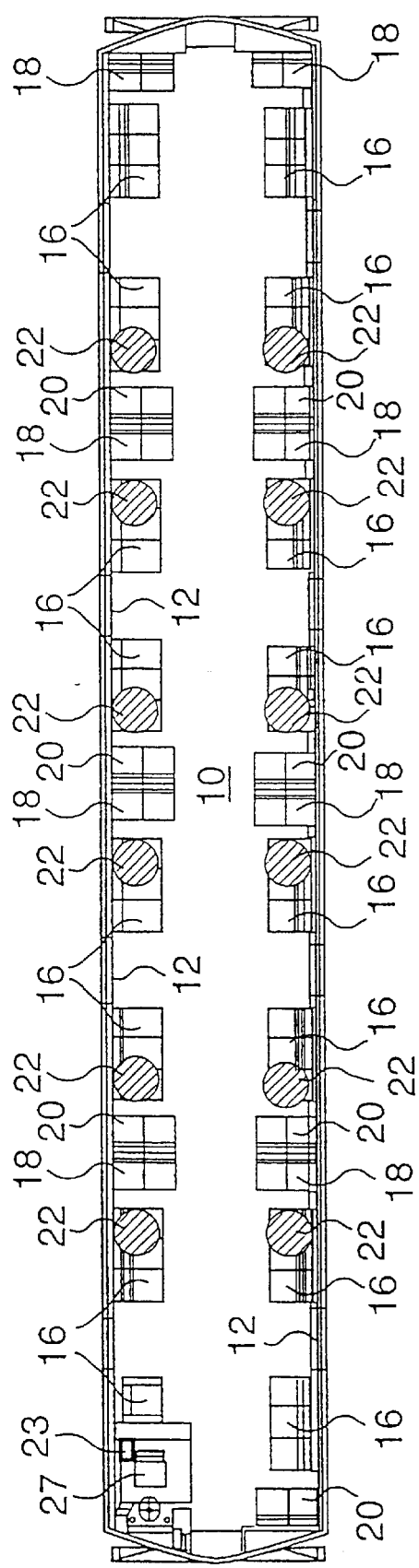
FIG. 1 shows in plan view (FIG. 1A) and in side elevation (FIG. 1B), an existing subway car as used on the Toronto Transit System with indications of appropriate locations for mounting video monitors according to the invention.
Figure 1B:
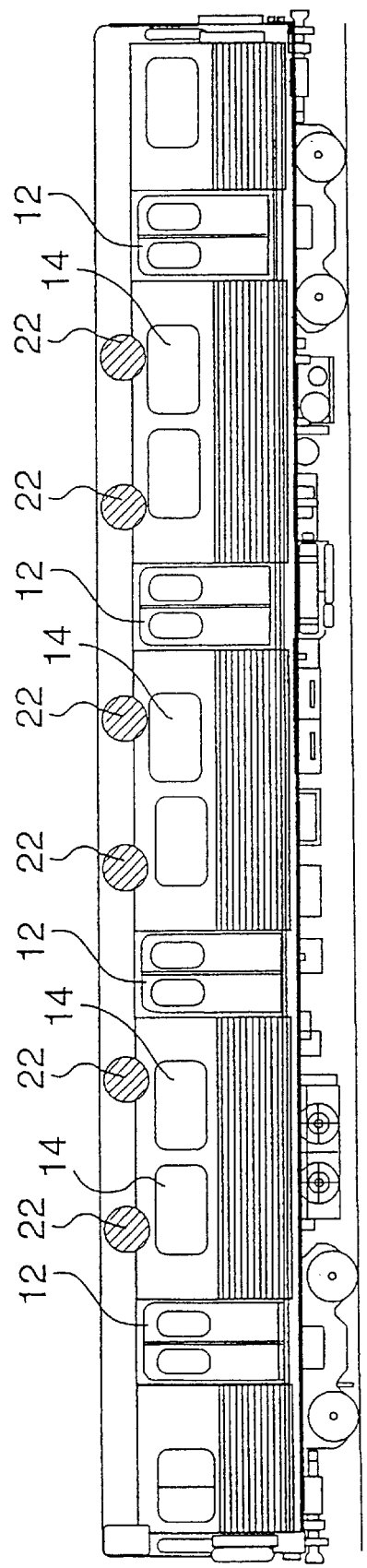

A typical subway car 10, as illustrated in FIGS. 1A and 1B, is equipped with sliding doors 12 and windows 14, spaced at convenient intervals along the length of the car. Passenger seats, in sets of 2's and 3's, are disposed beneath and alongside the windows 14, clear of the doors 12, some sets 16 being inward facing, other sets 18 being forward facing and other sets 20 being rearward facing.

Figure 2:
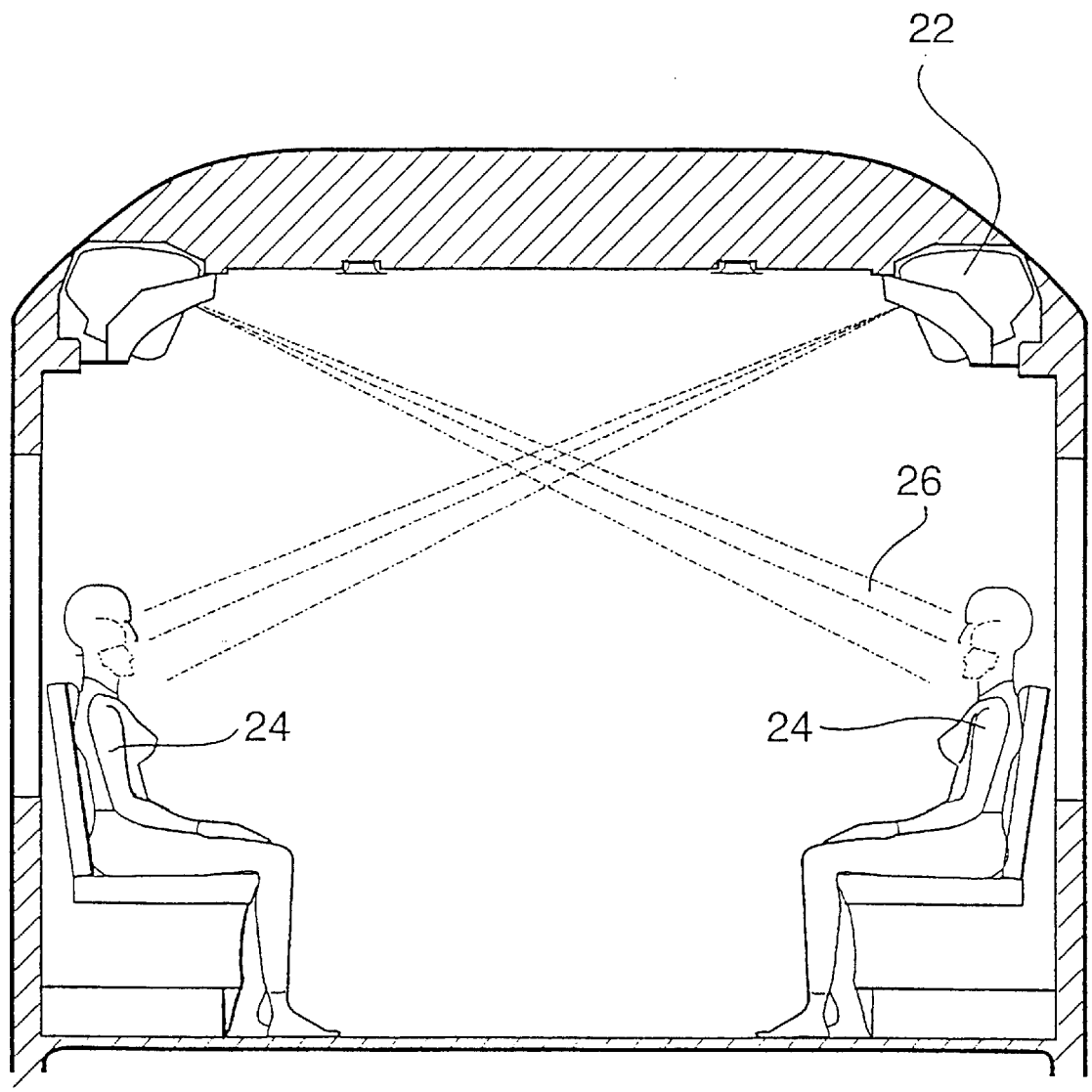
FIG. 2 is a sectional view of a subway car according to the invention with video monitors in place.

Suitable locations for video monitors 22 in accordance with the invention are at the junction of wall and ceiling of subway car 10, above the windows 14 and clear of the doors 12. They are thus disposed opposite to sets of inward facing seats 16, and angled downwardly for ease of viewing of passengers 24 seated in such inward facing seats 16, as shown in FIG. 2, with direct sight lines. 26, but visible to passengers seated elsewhere, and standing in the car 10. A video player 23 is suitably located in the driver's cab 27 (FIG. 1A), and connected to all the monitors 22 by cables (not showing) disposed in the cavity walls of the car.

Figure 3:
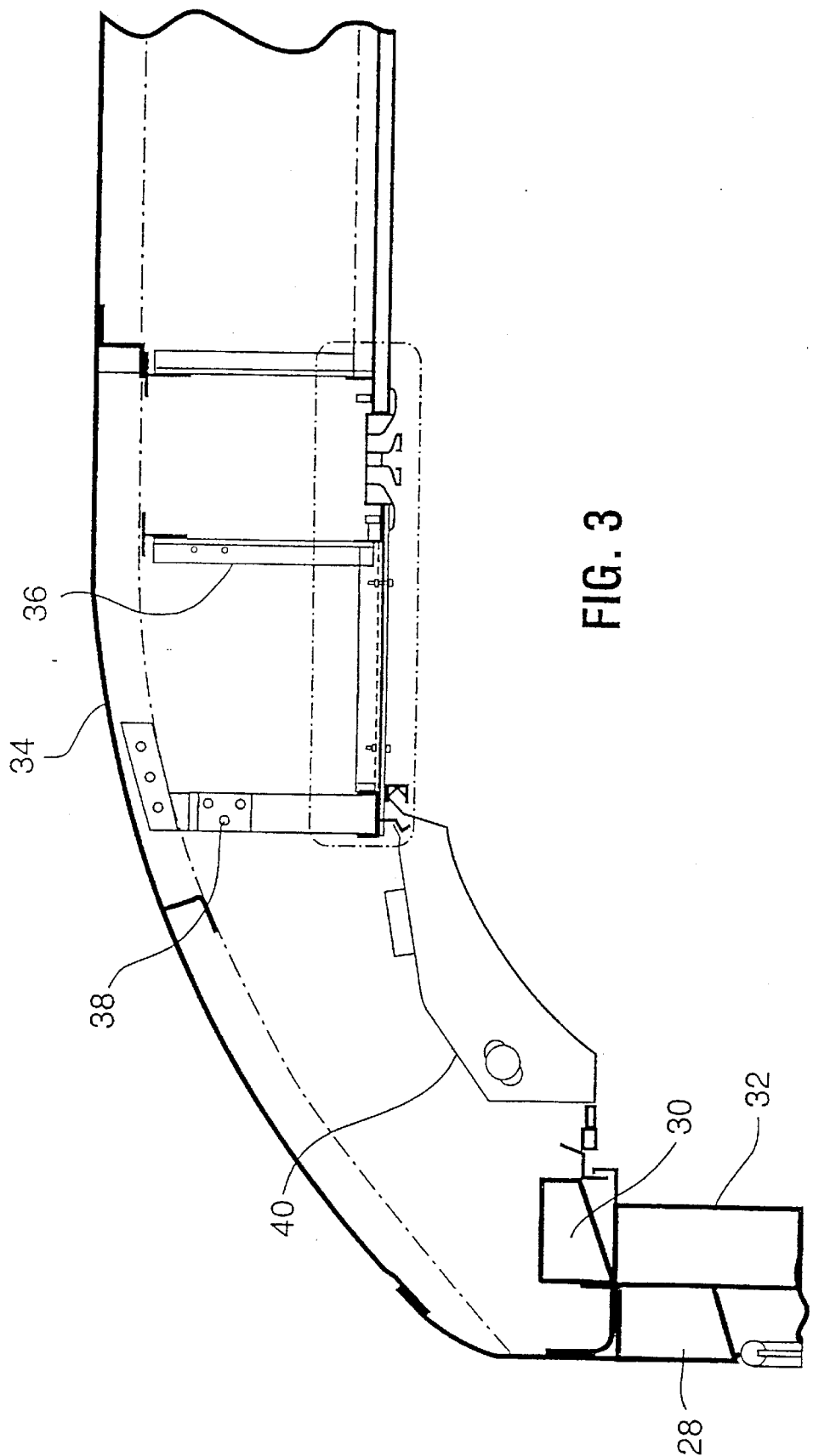
FIG. 3 is a detail, in section, of an existing subway car illustrating the location for receiving a video monitor according to the invention.

FIG. 3 shows a detail of the car 10, at the location where a monitor 22 is to be installed. The car wall has an outer shell 28 in which windows 14 are sealingly mounted, and structural pillars 30 mounted at intervals and secured to the vertical structural member 32. Centrally secured to the exterior skin and body structure of body 34 of the car is a main air duct 36 and a housing 38 carrying ceiling lights running substantially the full length of the car 10. The space between the ceiling housing 38 and the top of the pillars 30 is normally occupied by back lit advertising panels 40. Removal of appropriate portions of these panels 40 provides space for location of video monitors 22, according to the preferred embodiment of the invention.

Figure 4:
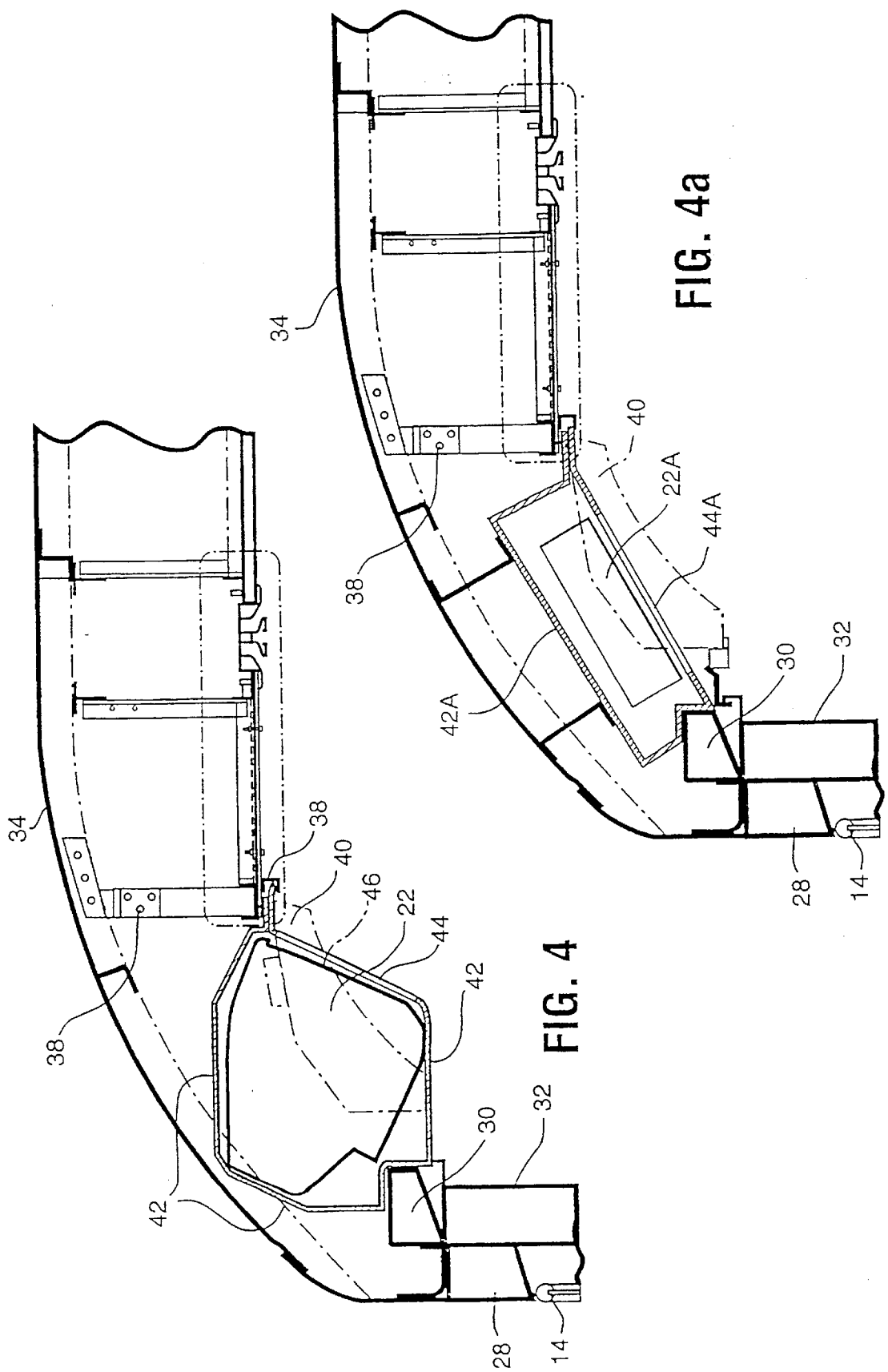
FIG. 4 is a detail similar to FIG. 3, with the video monitor in place.

Thus as shown in FIG. 4, the video monitor 22 is enclosed and rigidly mounted in its own enclosure 42, of stainless steel, rigid plastic or the like. The enclosure in turn is secured to the top of structural pillar 30 and the side of housing 38, in a space between the ends of illuminated panels 40, and protruding rearwardly to a position adjacent the outer part of the exterior skin and body structure 34. The front wall of enclosure 42 is comprised of a clear transparent polycarbonate shield 44, through which the screen 46 the monitor 22 is clearly visible. The screen 46 is angled downwardly for best viewing by a passenger 24 seated opposite. The enclosure 42 with monitor 22 therein and connections protruding outwardly therethrough is removable as a unit, for replacement or service.

An alternative embodiment is illustrated in FIG. 4A, a view similar to that of FIG. 4. In this alternative embodiment, CRT video monitor 22 is replaced with an LCD-based video monitor 22A which is of thin, rectangular cross-section, and occupies less space in the ceiling structure of the car. Accordingly, it can be moved towards the ceiling so that its viewing screen is substantially flush with or even behind the light panel 40. This use of an LCD-based monitor gives a better aesthetic appearance to the inside of the subway car as a whole, as well as improving the display performance by minimizing the interference effects, as previously discussed. An appropriately shaped enclosure 42A for the LCD-based monitor, with transport screen 44A, replaces enclosure 42 for the CRT video monitor, and is similarly mounted in place.

Figure 5:
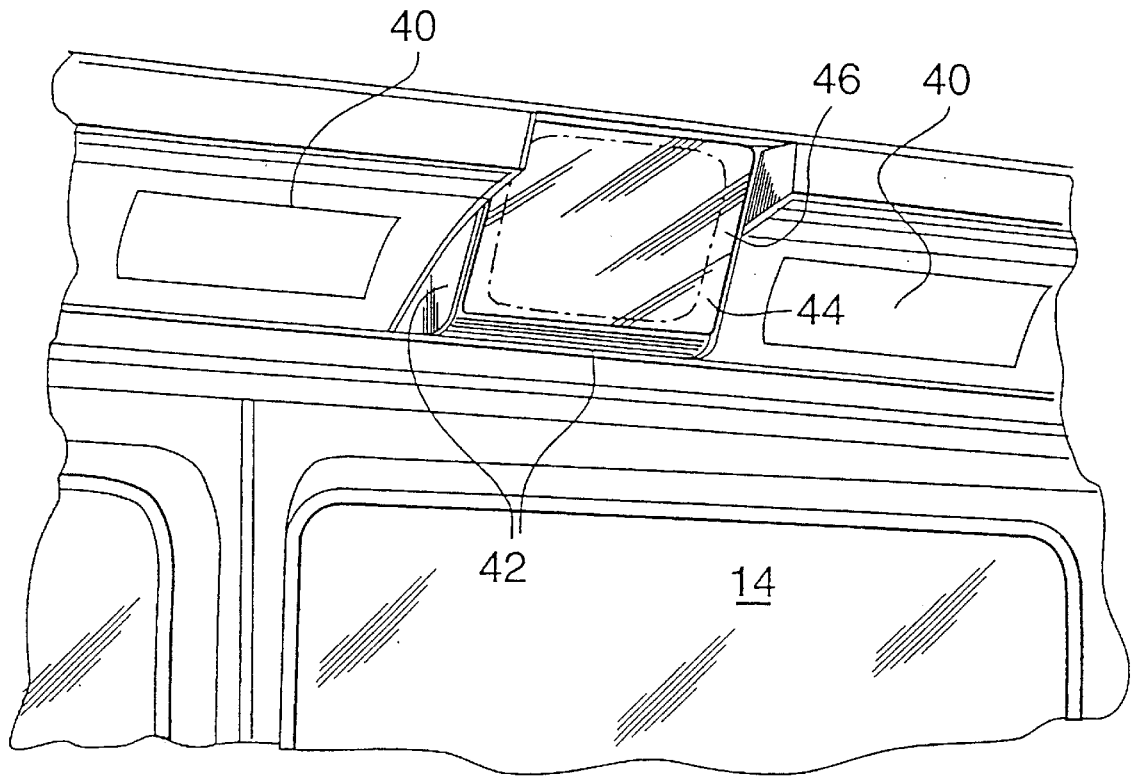
FIG. 5 is a detail in perspective view, of a subway car equipped with a monitor according to one embodiment of the invention.

FIG. 5 shows a front, perspective view of the arrangement shown in section in FIG. 4. The monitor 22 and its covering shield 44 are recessed behind the upper portion of the adjacent advertising panels 40, and the sides of the enclosure 42 protrude inwardly from the lower portion of panels 40. This provides ease of access to the enclosure 42 for its removal when necessary.

Figure 6:
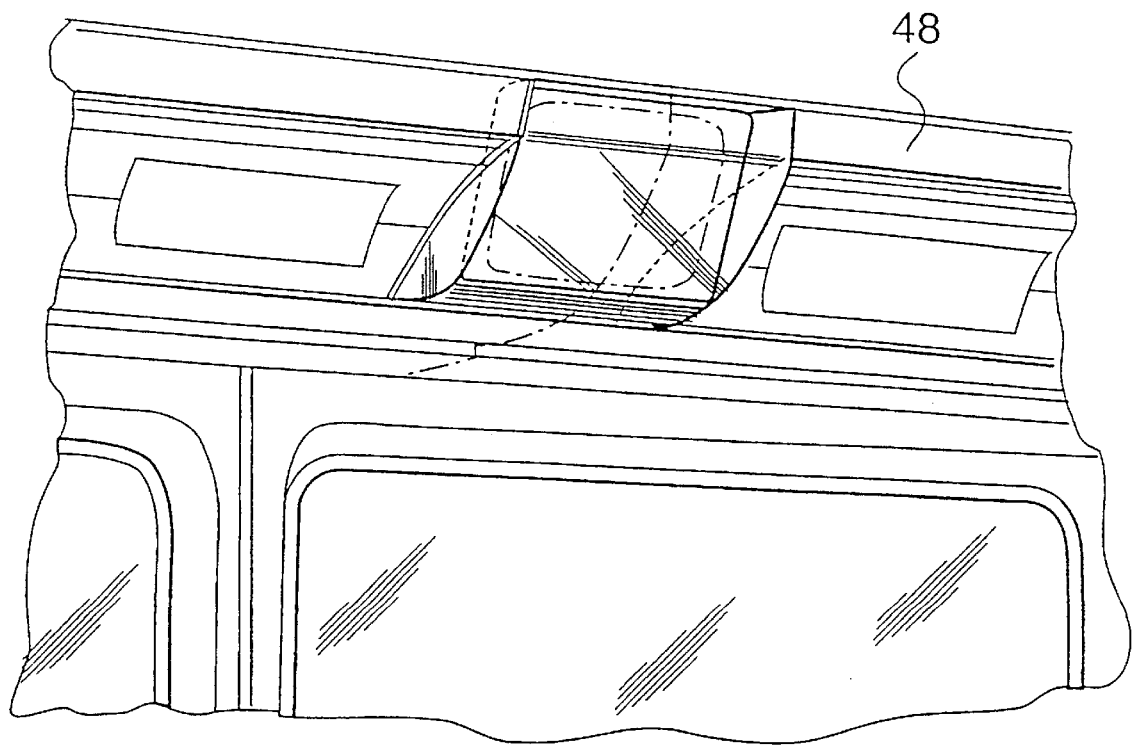
FIG. 6 is a detail similar to FIG. 5 but of a further alternative embodiment.
Figure 7:
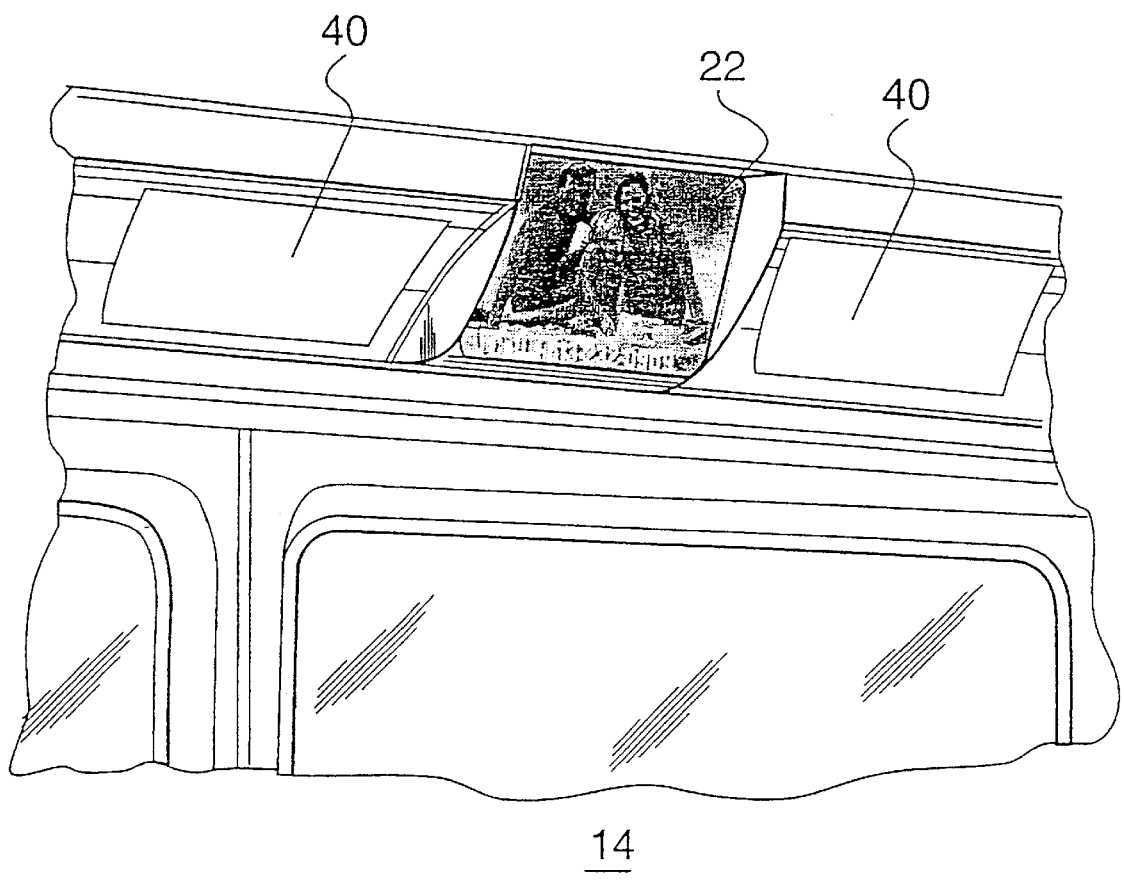
FIG. 7 is a view similar to FIG. 6, showing the general appearance when the monitor is operating.

An alternative arrangement is shown in FIG. 6. Here the polycarbonate shield 44 is convexly curved, and is disposed further forward from the monitor screen 44. The shield 44 now blends with forward facing part 48 the exterior skin and body structure 34, to provide a perhaps more aesthetically appealing arrangement. In FIG. 7, there is diagrammatically illustrated the arrangement of FIG. 6 in practical operation Poster-type illuminated advertisements are provided by advertising panels 40 flanking the video monitors 22, whilst the video monitor 22, disposed at intervals along the length of the car 10, show video information and/or advertising spots, at convenient, easily viewed locations and disposition to passengers riding in the car 10.

It will be appreciated that the specific embodiments illustrated and described herein are by way of example only, and are not to be construed as limiting on the scope of the invention. The description pertains specifically to the type of subway car currently in use in the Toronto Transit System, and illustrates a means and location for mounting the video monitors in such a system. Details of construction, and hence details of appropriate mounting for video monitors may differ from subway system to subway system according to the form of car in use. Such mounting details do not depart from the scope of the present invention. In all cases, it is contemplated that a plurality of monitors will be provided in each car, each rigidly mounted at a convenient location clear of the doors and windows, and at a disposition where it can be viewed by passengers riding the subway car, without difficulty. The provision of such video monitors mounted in their own enclosures as described herein, and faced with a transparent screen of, for example, polycarbonate, allows for considerable variation in the detail of mounting means and locations, to adapt them to different constructions of subway cars currently in use on different mass transit systems.

What is claimed is:

1. A subway car for mass transportation including longitudinal opposed sidewalls, a ceiling adjoining the sidewalls, a video display system comprising a plurality of video display monitors each having a video screen, and a video signal source unit operatively connected to said monitors, said monitors being spaced along the length of the car on opposed sides thereof, each of said monitor being mounted at the junction of the sidewall and ceiling, with the screen of the monitor substantially flushed with the adjacent wall surface structure of the car, and directed obliquely downwardly toward the car seats, so that each video screen is readily visible to passengers in the subway car.

2. The subway car of claim 1 wherein the video signal source system includes a pre-recorded video transmission program for feeding to display on the monitors of duration about 5–15 minutes.

3. The subway car of claim 1 wherein the program is repeatable, and includes a series of commercial messages of 30 second–1 minute duration.

4. The video system subway car of claim 1 which is sound free.

5. The subway car of claim 1 wherein the video signal source unit comprises a video tape player, a video disk player or computer-based digital video recorder.

6. The subway car of claim 1 wherein the video monitors include LCD screens.

7. The subway car of any of claim 1 including a self-contained wiring-cabling system connecting the video monitors to the video signal source unit.

* * * * *

(12) EX PARTE REEXAMINATION CERTIFICATE (10487th)
United States Patent
Blair

(10) Number: US 6,700,602 C1
(45) Certificate Issued: Jan. 29, 2015

(54) SUBWAY TV MEDIA SYSTEM

(76) Inventor: Scott Blair, Toronto (CA)

Reexamination Request:
No. 90/011,861, Aug. 16, 2011

Reexamination Certificate for:
Patent No.: 6,700,602
Issued: Mar. 2, 2004
Appl. No.: 09/423,284
Filed: Feb. 22, 2000

(21) Appl. No.: 90/011,861
(22) PCT Filed: May 6, 1998
(86) PCT No.: PCT/CA98/00439
§ 371 (c)(1),
(2), (4) Date: Feb. 22, 2000
(87) PCT Pub. No.: WO98/51081
PCT Pub. Date: Nov. 12, 1998

Related U.S. Application Data

(60) Provisional application No. 60/045,811, filed on May 7, 1997.

(51) Int. Cl.
*H04N 7/18* (2006.01)
*H04N 5/64* (2006.01)

(52) U.S. Cl.
USPC .......................................... 348/61; 348/837

(58) Field of Classification Search
None
See application file for complete search history.

(56) References Cited

To view the complete listing of prior art documents cited during the proceeding for Reexamination Control Number 90/011,861, please refer to the USPTO's public Patent Application Information Retrieval (PAIR) system under the Display References tab.

*Primary Examiner* — Stephen J Ralis

(57) ABSTRACT

A television system for subway cars (10) includes a plurality of TV monitors (22) mounted at intervals along the cars (10), at the junction of the sidewall and the ceiling, and a central video signal source unit (23) such as a video tape player, video disk player, computer-based digital video recorder or television receiver, connected to the video monitors (22). Programs of short duration, e.g. 5-15 minutes, matching the average length of a subway ride, and comprising advertising messages, news bytes and the like are played and displayed in the monitors repeatedly during the subway ride.

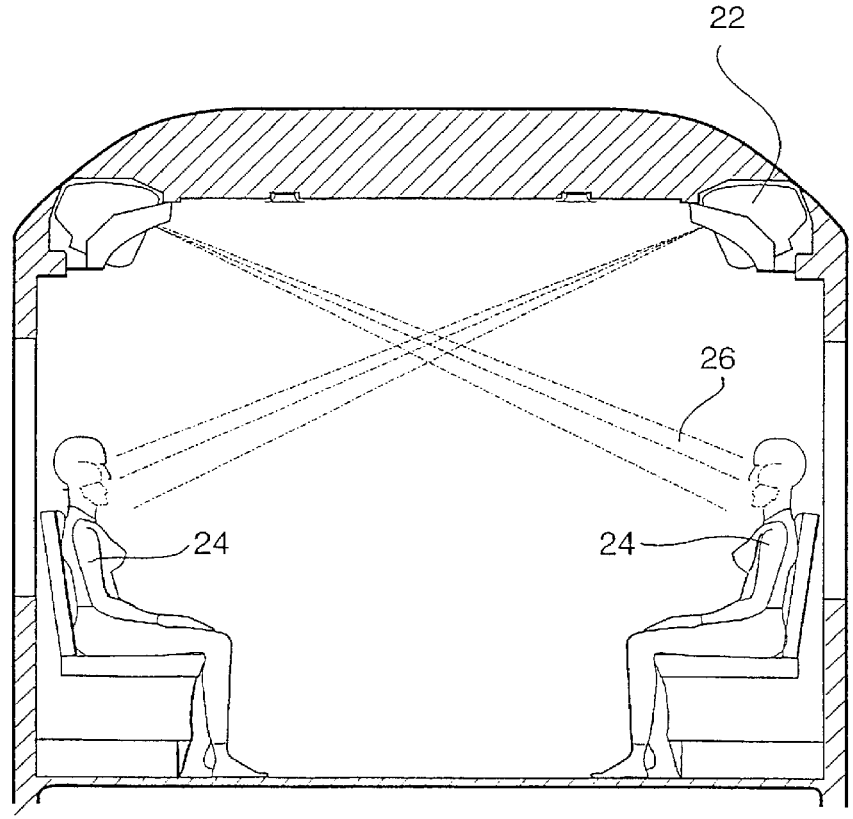

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

New claims 8-29 are added and determined to be patentable.

Claims 2-7 were not reexamined.

8. *A subway car for mass transportation, comprising:*
*a video display system comprising a plurality of video display monitors each having a video screen, and a video signal source unit operatively connected to said video display monitors;*
*a plurality of transparent cover units that cover respective ones of the video display monitors;*
*a pair of longitudinal opposed sidewalls, each of the sidewalls comprising a transitional wall portion at the junction of the sidewall and ceiling that is directed obliquely downwardly; and*
*a ceiling adjoining the sidewalls;*
*wherein the monitors are spaced along the length of the car on opposed sides thereof, the monitors being disposed within the transitional wall portion such that the transparent cover units covering respective ones of the video display monitors are substantially flush with the adjacent surface structure of the transitional wall portion, wherein the monitors are also directed obliquely downwardly toward the car seats so that each video screen is readily visible to passengers in the subway car.*

9. *The subway car of claim 8, wherein the plurality of transparent cover units are rigid and are further configured to protect the video display monitor.*

10. *The subway car of claim 9, wherein the video display monitor is disposed within the transitional wall portion such that it contains no visible edges or protuberances.*

11. *The subway car of claim 8, further comprising a back lit panel disposed on the transitional wall portion, the back lit panel disposed adjacent the video screen of the video display monitor.*

12. *The subway car of claim 8, wherein the video display monitors are each enclosed within an enclosure.*

13. *The subway car of claim 12, wherein the enclosure is secured to a structural member disposed between an inner wall and an outer structural shell of the subway car.*

14. *The subway car of claim 13, wherein the enclosure and a respective video display monitor is removable from the subway car as a unit.*

15. *A subway car for mass transportation including longitudinal opposed sidewalls that further comprise a transitional segment and a ceiling adjoining the sidewalls with the transitional segment disposed at the junction of the sidewall and the ceiling, the subway car further comprising:*
*a video display system comprising:*
*a plurality of video display monitors each having a video screen; and*
*a video signal source unit operatively connected to said video display monitors;*
*wherein said video display monitors are spaced along the length of the car on opposing sides of the subway, each of the video display monitors being mounted within the transitional segment, with the video screen of each video display monitor being substantially contiguous with an exterior surface of said transitional segment, said video screen being directed obliquely downwardly toward the car seats so that each video screen is readily visible to passengers in the subway car; and*
*a back lit panel disposed on the transitional segment disposed adjacent the ceiling and a respective sidewall.*

16. *The subway car of claim 15, wherein an external surface of the longitudinal opposed sidewall, the exterior surface of said transitional segment and an external surface of the ceiling comprise a blended contour.*

17. *The subway car of claim 15, wherein the video signal source unit is configured to display a series of short messages in sequence on said plurality of video display monitors.*

18. *The subway car of claim 17, wherein the series of short messages comprise advertising content, said advertising content providing an additional source of revenue for the operator of the subway car.*

19. *The subway car of claim 15, wherein the back lit panel is disposed adjacent the video screen of the video display monitor.*

20. *A subway car for mass transportation including longitudinal opposed sidewalls, a ceiling adjoining the sidewalls, a video display system comprising a plurality of video display monitors each having a video screen, and a video signal source unit operatively connected to said monitors,*
*said monitors being spaced along the length of the car on opposed sides thereof, each of said monitors being mounted at the junction of the sidewall and ceiling and further being covered with a transparent cover unit, with the transparent cover unit flushed with the adjacent wall surface structure of the car, and with the monitors directed obliquely downwardly toward the car seats, so that each video screen is readily visible to passengers in the subway car.*

21. *The subway car of claim 20, wherein the transparent cover unit for a respective video display monitor is rigid and is further configured to protect the video display monitor.*

22. *The subway car of claim 20, wherein the transparent cover unit is flushed within the adjacent wall structure such that it contains no protuberances.*

23. *The subway car of claim 20, further comprising a back lit panel disposed on the adjacent wall surface structure of the car.*

24. *The subway car of claim 20, wherein the video display monitors are each enclosed within an enclosure.*

25. *The subway car of claim 24, wherein the enclosure is secured to a structural member disposed between an inner wall and an outer structural shell of the subway car.*

26. *The subway car of claim 25, wherein the enclosure and a respective video display monitor is removable from the subway car as a unit.*

27. *The subway car of claim 20, wherein an external surface of the longitudinal opposed sidewalls, the adjacent wall surface structure and an external surface of the ceiling comprise a blended contour.*

28. The subway car of claim 20, wherein the video signal source unit is configured to display a series of short messages in sequence on said plurality of video display monitors.

29. The subway car of claim 28, wherein the series of short messages comprise advertising content, said advertising content providing an additional source of revenue for the operator of the subway car.

* * * * *